United States Patent
Andreasen et al.

(10) Patent No.: US 7,957,314 B2
(45) Date of Patent: Jun. 7, 2011

(54) SYSTEM AND METHOD FOR PROVISIONING CHARGING AND POLICY CONTROL IN A NETWORK ENVIRONMENT

(75) Inventors: Flemming S. Andreasen, Marlboro, NJ (US); John W. Evans, Somerset (GB); Eric P. Hamel, Paris (FR)

(73) Assignee: Cisco Technology, Inc., San Jose, CA (US)

(*) Notice: Subject to any disclaimer, the term of this patent is extended or adjusted under 35 U.S.C. 154(b) by 152 days.

(21) Appl. No.: 12/333,859

(22) Filed: Dec. 12, 2008

(65) Prior Publication Data
US 2010/0150003 A1    Jun. 17, 2010

(51) Int. Cl.
*H04L 1/00* (2006.01)
(52) U.S. Cl. ........................................................ 370/252
(58) Field of Classification Search .................. None
See application file for complete search history.

(56) References Cited

U.S. PATENT DOCUMENTS

| | | | |
|---|---|---|---|
| 6,304,567 B1 | 10/2001 | Rosenberg | |
| 6,937,597 B1 | 8/2005 | Rosenberg et al. | |
| 6,970,909 B2 | 11/2005 | Schulzrinne | |
| 7,170,863 B1 | 1/2007 | Denman et al. | |
| 7,170,887 B2 | 1/2007 | Rosenberg | |
| 2004/0003241 A1 | 1/2004 | Sengodan et al. | |
| 2004/0219905 A1 | 11/2004 | Blumenthal et al. | |
| 2005/0238002 A1 | 10/2005 | Rasanen | |
| 2005/0278532 A1 | 12/2005 | Fu et al. | |
| 2006/0251043 A1 | 11/2006 | Madour et al. | |
| 2006/0251229 A1 | 11/2006 | Gorti et al. | |
| 2009/0034426 A1* | 2/2009 | Luft et al. | 370/252 |
| 2009/0129271 A1* | 5/2009 | Ramankutty et al. | 370/235 |
| 2009/0264096 A1* | 10/2009 | Cai et al. | 455/406 |
| 2009/0323632 A1* | 12/2009 | Nix | 370/331 |

* cited by examiner

*Primary Examiner* — Seema Rao
*Assistant Examiner* — Jianye Wu
(74) *Attorney, Agent, or Firm* — Patent Capital Group

(57) ABSTRACT

A method is provided in one example embodiment and includes requesting real-time transfer protocol (RTP) quality metrics to be generated by a network for a specific flow in the network. The method also includes recording the RTP quality metrics and reporting the metrics as accounting data associated with the flow. In more specific embodiments, the accounting data includes a correlator with application level accounting and the accounting data is used for quality monitoring and troubleshooting on a per-subscriber basis, on a per-flow basis, or on a per-call basis. An application function can request RTP quality monitoring with a trigger that identifies if a quality parameter reaches a certain threshold.

14 Claims, 3 Drawing Sheets

OVERALL PCC LOGICAL ARCHITECTURE

OVERALL PCC ARCHITECTURE
(ROAMING WITH HOME ROUTED ACCESS)

OVERALL PCC ARCHITECTURE FOR ROAMING WITH PCEF IN VISITED NETWORK (LOCAL BREAKOUT)

SYSTEM AND METHOD FOR PROVISIONING CHARGING AND POLICY CONTROL IN A NETWORK ENVIRONMENT

TECHNICAL FIELD OF THE INVENTION

This invention relates in general to the field of communications and, more particularly, to a system and a method for provisioning charging and policy control in a network environment.

BACKGROUND OF THE INVENTION

Networking architectures have grown increasingly complex in communications environments. In addition, the augmentation of clients or end users wishing to communicate in a network environment has caused many networking configurations and systems to respond by adding elements to accommodate the increase in networking traffic. As the subscriber base of end users increases, proper routing and efficient management of communication sessions and data flows become even more critical.

Service providers can offer real-time media services [such as voice and video] over Internet Protocol (IP)-based networks. Real-time media services are susceptible to a wide range of quality issues, including packet loss, packet delay, and packet jitter. The Real-time Transfer Protocol (RTP), which is typically used to transport voice and video over IP, and its companion RTP Control Protocol (RTCP) are designed to facilitate computation of quality metrics by the endpoints involved in an RTP session. The basic RTP/RTCP specification offers guidance on how to calculate and communicate packet loss, delay, and jitter information among the RTP session participants. Other specifications offer information on how to calculate and communicate other statistics such as extended reports including voice over IP (VoIP) metrics, audio metrics, and video metrics.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes requesting (RTP) quality metrics to be generated for a specific flow in a network. The method also includes recording the RTP quality metrics. The metrics can be recorded as accounting data associated with the flow. In more specific embodiments, the accounting data includes a correlator with application level accounting and the accounting data is used for quality monitoring and troubleshooting on a per-subscriber basis or on a per-call basis. An application function can request RTP quality monitoring with a trigger that identifies if a quality parameter reaches a certain threshold. In still other embodiments, an RTP quality thresholds information element is defined that outlines a trigger condition associated with a packet loss rate, and the packet loss rate includes a lower and an upper bound, and the trigger condition is used by the application function to adjust parameters for an associated application. In one example implementation, the RTP quality metrics are RTP packet loss, RTP packet jitter, and RTP packet delay.

Figure 1:
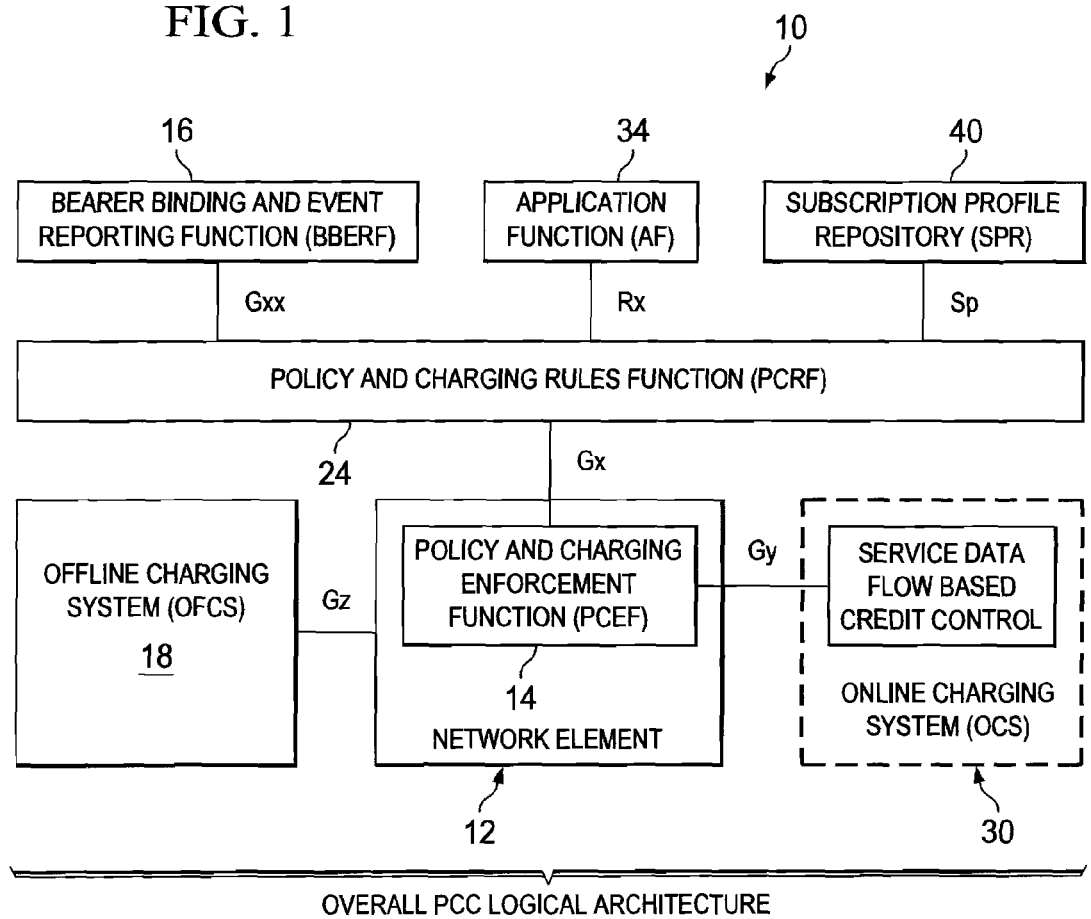
FIG. 1 is a simplified block diagram of a communication system for provisioning charging and policy control in a network environment in accordance with one embodiment of the present invention.

Turning to FIG. 1, FIG. 1 is a simplified block diagram of a communication system 10 for provisioning charging and policy control in a network environment. Communication system 10 may include a network element 12, which includes a policy and charging enforcement function (PCEF) 14. Communication system 10 also includes a bearer binding and event reporting function (BBERF) 16, an offline charging system (OFCS) 18, a policy and charging rules function (PCRF) 24, and an online charging system (OCS) 30, which includes a service data flow based credit control. Communication system 10 also includes an application function (AF) 34 and a subscription profile repository (SPR) 40. Each of these elements may couple to one another through simple interfaces (as illustrated) or through any other suitable connection that provides a viable pathway for network communications. Additionally, any one or more of these elements may be combined or removed from the architecture based on particular needs.

Communication system 10 may include a configuration capable of transmission control protocol/internet protocol (TCP/IP) communications for the transmission or reception of packets in a network. Communication system 10 may also operate in conjunction with a user datagram protocol/IP (UDP/IP) or any other suitable protocol where appropriate and based on particular needs.

In accordance with the techniques and teachings of the present invention, communication system 10 provides a communication approach that enhances an existing policy and charging control architecture. Part of the solution can enable the application function to ask for real-time transfer protocol (RTP) quality metrics to be performed by the network for a specific flow. The RTP quality metrics can be recorded by the PCEF and reported as accounting data associated with the flow. Since such accounting data normally includes a correlator with the application level accounting, it facilitates overall quality monitoring and troubleshooting on a per-subscriber and/or per-call basis. The AF may also request RTP quality monitoring, with a trigger that informs the AF (and/or the PCRF) if the quality reaches a certain threshold.

In terms of advantages, such a solution does not necessarily require any new elements or additional interfaces to be deployed, but instead relies on the existing AF/PCRF/PCEF and charging data function (CDF) elements and their associated interfaces. Furthermore, the solution can be integrated with the overall policy and charging control, thereby providing for an integrated solution where per-call information can be readily available in the overall system. Also, the solution avoids the need for expensive and less accurate deep packet inspection (DPI)-based, session border controllers (SBCs)-based, or similar "external" and non-integrated approaches.

Note that for purposes of illustrating the techniques of communication system 10, it is important to understand the somewhat esoteric communications that may be traversing the network. The following foundational information may be viewed as a basis from which the present invention may be properly explained. Such information is offered earnestly for purposes of explanation only and, accordingly, should not be construed in any way to limit the broad scope of the present invention and its potential applications.

A service provider that wants to provide media services with good quality to its end-users should manage and monitor the network over which the services are provided. Preferential quality of service (QoS) treatment [for example] can help alleviate many common quality problems; however, monitoring of the network and the RTP sessions can still be important to verify that users actually obtain good quality. The RTP statistics provide valuable information for this; however, many approaches for providing such statistics suffer from several shortcomings such as: 1) the statistics are generated by the endpoints only. If an endpoint does not provide RTCP statistics, there is no usable statistics information available; 2) RTCP statistics may not be available to the service provider. Some protocols (for example MGCP, H.248 and SIP) allow the endpoints to communicate RTCP statistics to the service provider infrastructure; however, not all endpoints implement this (especially not in the case of SIP endpoints); 3) RTCP statistics generated by an endpoint may not be trustworthy. For example, if users have a financial incentive to provide statistics with poor quality metrics (free call if quality is bad), the service provider cannot trust the statistics information; 4) RTCP statistics are typically "end-to-end." If quality issues are found for a particular call, RTCP does not help pinpoint where the issue occurred, e.g., in the local access network, backbone, or remote access network.

To overcome some of these problems, service providers may deploy probes in their networks. Active probes typically generate some amount of traffic between two entities and observe the resulting quality. Passive probes on the other hand inspect traffic as it flows through the network and attempts to determine the quality based on that. This can be done either in aggregate or on a per-session basis (e.g., by use of deep packet inspection capabilities). Such an approach can be quite resource intensive (and, hence, expensive) and it lacks overall integration with the service provider's real-time media services infrastructure (e.g., call control). This makes it expensive and difficult to associate any observed problems with specific customers or calls. Similarly, if customers report problems with a particular call, it can be difficult to find the relevant statistics information for that call.

Another flawed approach involves the use of SBCs. SBCs participate actively in the signaling required to establish the media session and are therefore less resource intensive than deep packet inspectors. However the use of an active intermediary that processes both signaling and media still adds overall cost and complexity. SBCs may also lack integration with the service provider's real-time media services infrastructure (e.g., call control), and they break end-to-end transparency, which in some cases is not acceptable (e.g., for end-to-end security).

Yet another approach involves the use of a media relay, which can be actively managed by and integrated with the service provider's real-time media services infrastructure (e.g., call control). An example of this could be the border gateway function (BGF). The BGF can create a media relay under the instruction of the service policy decision function (SPDF), which in turn interacts with an application function (AF) (e.g., SIP Call Control infrastructure). The SPDF can instruct the BGF to create RTP statistics for a session (by use of the RTP or other H.248 packages over the Ia interface), which provides integration with the service provider's real-time media services. There are however several drawbacks with the use of the BGF function. First, by being a media relay, it adds overall cost and complexity. Secondly, the BGF relay is typically inserted actively by the service provider's application infrastructure thereby breaking end-to-end transparency, which in turn may break end-to-end security, as well as some applications (for example, SIP proxies).

In summary, existing solutions suffer from various drawbacks when it comes to having RTP statistics available to the service provider's infrastructure where it can be used to help monitor, diagnose, and troubleshoot real-time media services quality issues. Example embodiments of the invention propose a solution that avoids some of these drawbacks.

Before turning to some of the operations of this architecture, a brief discussion is provided about some of the infrastructure of FIG. 1. FIG. 1 depicts an overall policy and charging control (PCC) logical architecture (potentially applicable to a non-roaming example). The PCC functionality can include the functions of PCEF 14, BBERF 16, PCRF 24, AF 34, OCS 30, OFCS 18, and SPR 40.

The PCC architecture extends the architecture of an IP-connectivity access network (IP-CAN), where PCEF 14 can be a functional entity in network element 12 (e.g., a gateway node) implementing the IP access to the packet data network (PDN). The allocation of BBERF 16 can be specific to each IP-CAN type.

The PCEF encompasses service data flow detection, policy enforcement and flow based charging functionalities. This functional entity can be located at a gateway (e.g., GGSN in the GPRS case, and PDG in the WLAN case). It can provide service data flow detection, user plane traffic handling, triggering control plane session management (where the IP-CAN permits), QoS handling, and service data flow measurement as well as online and offline charging interactions. A PCEF can ensure that an IP packet, which can be discarded at the PCEF as a result of policy enforcement or flow based charging, can be neither reported for offline charging nor cause credit consumption for online charging.

The PCEF can enforce the policy control as indicated by the PCRF in several different ways: 1) gate enforcement [the PCEF can allow a service data flow, which is subject to policy control, to pass through the PCEF when the corresponding gate can be open]; 2) QoS enforcement [QoS class identifier correspondence with IP CAN specific QoS attributes]. The PCEF can convert a QoS class identifier value to IP CAN specific QoS attribute values and determine the QoS class identifier value from a set of IP CAN specific QoS attribute values.

For the PCC rule QoS enforcement, the PCEF can enforce the authorized QoS of a service data flow according to the active PCC rule (e.g., to enforce uplink DSCP marking). For IP-CAN bearer QoS enforcement, the PCEF can control the QoS that is provided to a combined set of service data flows. The policy enforcement function ensures that the resources, which can be used by an authorized set of service data flows, are within the "authorized resources" specified via the Gx interface by "authorized QoS." The authorized QoS provides an upper bound on the resources that can be reserved (GBR) or allocated (MBR) for the IP-CAN bearer. The authorized QoS information can be mapped by the PCEF to IP-CAN specific QoS attributes.

The PCEF can be enforcing the charging control in the following way. For a service data flow (defined by an active PCC rule) that is subject to charging control, the PCEF can allow the service data flow to pass through the PCEF when there is a corresponding active PCC rule with and, for online charging, the OCS has authorized credit for the charging key.

The PCEF may let a service data flow pass through the PCEF during the course of the credit re-authorization procedure.

For a service data flow (defined by an active PCC rule) that is subject to both policy control and charging control, the PCEF can allow the service data flow to pass through the PCEF when the right conditions from both policy control and charging control happen.

For a service data flow (defined by an active PCC rule) that is subject to policy control only and not charging control, the PCEF can allow the service data flow to pass through the PCEF when the conditions for policy control are met.

A PCEF may be served by one or more PCRF nodes. The PCEF can contact the appropriate PCRF based on the packet data network (PDN) connected to, together with, a user equipment (UE) identity information (if available, and which may be IP-CAN specific). It can be possible to ensure that the same PCRF is contacted for a specific UE irrespective of the IP-CAN used. The PCEF can, on request from the PCRF, modify a PCC rule, using the equivalent PCEF behavior as the removal of the old and the activation of the new (modified) PCC rule. The PCEF can modify a PCC rule as an atomic operation.

The PCEF can support predefined PCC rules. The operator may apply different PCC rules depending on a different public land mobile network (PLMN). The PCEF can provide an identifier of the serving network to the PCRF, which may be used by the PCRF in order to select the PCC rule to be applied. The operator may configure whether policy and charging control is to be applied based on different access point. The PCEF can gather and report IP-CAN bearer usage information. The PCEF may have a pre-configured default charging method. Upon the initial interaction with the PCRF, the PCEF can provide pre-configured default charging method if available.

At IP-CAN session establishment, the PCEF can initiate the IP-CAN session establishment procedure. In case the SDF can be tunneled at the BBERF, the PCEF can inform the PCRF about the mobility protocol tunneling header of the service data flows. If no PCC rule was activated for the IP-CAN session, the PCEF can reject the IP-CAN session establishment.

If there is no PCC rule active for a successfully established IP-CAN session at any later point in time, e.g., through a PCRF initiated IP-CAN session modification, the PCEF can initiate an IP-CAN session termination procedure. If the PCRF terminates the Gx session, the PCEF can initiate an IP-CAN session termination procedure.

Hence, the PCRF encompasses policy control decision and flow based charging control functionalities. The PCRF provides network control regarding the service data flow detection, gating, QoS, and flow based charging (except credit management) towards the PCEF. The PCRF can apply the security procedures, as required by the operator, before accepting service information from the AF.

The PCRF can decide how a certain service data flow can be treated in the PCEF, and ensure that the PCEF user plane traffic mapping and treatment is in accordance with the user's subscription profile. If Gxx applies, the PCRF can provide QoS rules with service data flow templates as provided to the PCEF in the PCC rules. If the service data flow is tunneled at the BBERF, the PCRF can provide the BBERF with information received from the PCEF to enable the service data flow detection in the mobility tunnel at the BBERF.

The PCRF should (for an IP-CAN session) derive, from IP-CAN specific restrictions, operator policy, and SPR data, the list of permitted QoS class identifiers and associated GBR and MBR limits for the IP-CAN session. The PCRF may check that the service information provided by the AF can be consistent with both the operator defined policy rules and the related subscription information as received from the SPR during IP-CAN session establishment before storing the service information. The service information can be used to derive the QoS for the service. The PCRF may reject the request received from the AF when the service information is not consistent with either the related subscription information or the operator defined policy rules and, as a result, the PCRF can indicate that this service information is not covered by the subscription information or by operator defined policy rules and may indicate, in the response to the AF, the service information that can be accepted by the PCRF (e.g., the acceptable bandwidth).

The PCRF can authorize QoS resources. The PCRF uses the service information received from the AF (e.g., SDP information or other available application information) and/or the subscription information received from the SPR to calculate the proper QoS authorization (QoS class identifier, bitrates). The PCRF may also take into account the requested QoS received from the PCEF via the Gx interface.

The PCRF may use the subscription information as a basis for the policy and charging control decisions. The subscription information may apply for both session based and non-session based services. The PCRF can determine whether a Gx session from the PCEF is to be linked with a Gxx session from the BBERF by matching the IP address (es) and conditionally the UE Identity and PDN ID towards open Gxx sessions. If the BBERF does not provide any PDN ID at the gateway control session establishment, then the PCRF maintains Gxx to Gx session linking to the Gx sessions where the assigned care of address (CoA) and UE Identity (if available over Gxx) are equal. The PCRF and BBERF can be capable of separating information for each IP-CAN session within the common gateway control session.

If the BBERF provides a PDN ID at the gateway control session establishment, then the PCRF maintains Gxx to Gx session linking where the UE identity and PDN ID are equal. If an AF requests the PCRF to report on the signaling path status, for the AF session, the PCRF can, upon indication of loss of resources from the PCEF, for PCC rules corresponding to the signaling traffic notify the AF on changes to the signaling path status. The PCRF should have the knowledge of which PCC rules identify signaling traffic.

If an AF requests the PCRF to report on the change of a type of IP CAN, the PCRF can provide to the AF the information about the IP CAN type the user is currently using and upon indication of change of IP CAN type, notify the AF on changes of the type of IP CAN. In the case of 3GPP IP CAN, the information of the radio access technology type (e.g., UTRAN) can be also reported to the AF. If Gxx applies and the PCEF provided information about required event triggers, the PCRF can provide these event triggers to the BBERF and notify the PCEF of the outcome of the provisioning procedure by using the PCRF initiated IP-CAN session modification procedure. The PCRF can include the parameter values received in the response from the BBERF in the notification to the PCEF. When the PCRF gets an event report from the BBERF that can be required by the PCEF, the PCRF can forward this event report to the PCEF.

The AF can be an element offering applications that require dynamic policy and/or charging control over the IP-CAN user plane behavior. The AF can communicate with the PCRF to transfer dynamic session information, used for PCRF decisions as well as to receive IP-CAN specific information and notifications about IP-CAN bearer level events. One example of an AF can be the P-CSCF of the IMS CN subsystem.

The AF may receive an indication that the service information is not accepted by the PCRF together with service information that the PCRF would accept. In that case, the AF can reject the service establishment towards the UE. If possible, the AF forwards the service information to the UE that the PCRF would accept.

An AF may communicate with multiple PCRFs. The AF can contact the appropriate PCRF based on either: 1) the end user IP address; and/or 2) a UE identity that the AF can be aware of. In case of private IP address being used for the end user, the AF may send additional PDN information (e.g., PDN ID) over the Rx interface. This PDN information can be used by the PCRF for session binding, and it can also be used to help selecting the correct PCRF.

For certain events related to policy control, the AF can be able to give instructions to the PCRF to act on its own. The AF may use the IP CAN bearer level information in the AF session signaling or to adjust the IP CAN bearer level event reporting. The AF may request the PCRF to report on the signaling path status for the AF session. The AF can cancel the request when the AF ceases handling the user.

The SPR logical entity contains subscriber/subscription related information needed for subscription-based policies and IP-CAN bearer level PCC rules by the PCRF. The SPR may be combined with or distributed across other databases in the operator's network. The SPR may provide the following subscription profile information (per PDN, which can be identified by the PDN identifier): 1) subscriber's allowed services; 2) for each allowed service, a pre-emption priority; 3) information on subscriber's allowed QoS; 4) subscriber's charging related information (e.g., location information relevant for charging); and 5) subscriber category.

The service data flow based credit control function performs online credit control functions. It can be a functional entity within OCS 30. The OCS may trigger the PCEF to initiate an IP-CAN bearer service termination at any point in time. There may be several OCSs in a PLMN. The default OCS addresses (i.e. the primary address and secondary address) can be locally pre-configured within the PCEF. OCS addresses may also be passed once per IP-CAN session from the PCRF to the PCEF. The OCS addresses provided by the PCRF can have a higher priority than the pre-configured ones.

The BBERF includes the following functionalities: 1) bearer binding; 2) uplink bearer binding verification; 3) event reporting to the PCRF; and 4) sending or receiving IP-CAN-specific parameters, to or from the PCRF. The service data flow detection at the BBERF can be identical to the detection at PCEF with the following modifications: If the service data flow is tunneled at the BBERF, the BBERF uses information on the mobility protocol tunneling header provided by the PCRF and the QoS rules to detect the service data flows.

For the uplink direction, the BBERF applies QoS rules with a bearer binding to the bearer that the packet arrived on. The uplink bearer binding verification can be successful if there is a QoS rule with a matching uplink SDF filter. The BBERF can discard packets for which the uplink bearer binding verification fails.

The ARP can be used by the BBERF in the same way as in the PCEF. In order to support the different IP-CAN bearer establishment modes (UE-only or UE/NW), the BBERF can support the same procedures for handling different IP-CAN bearer establishment modes.

Figure 2:
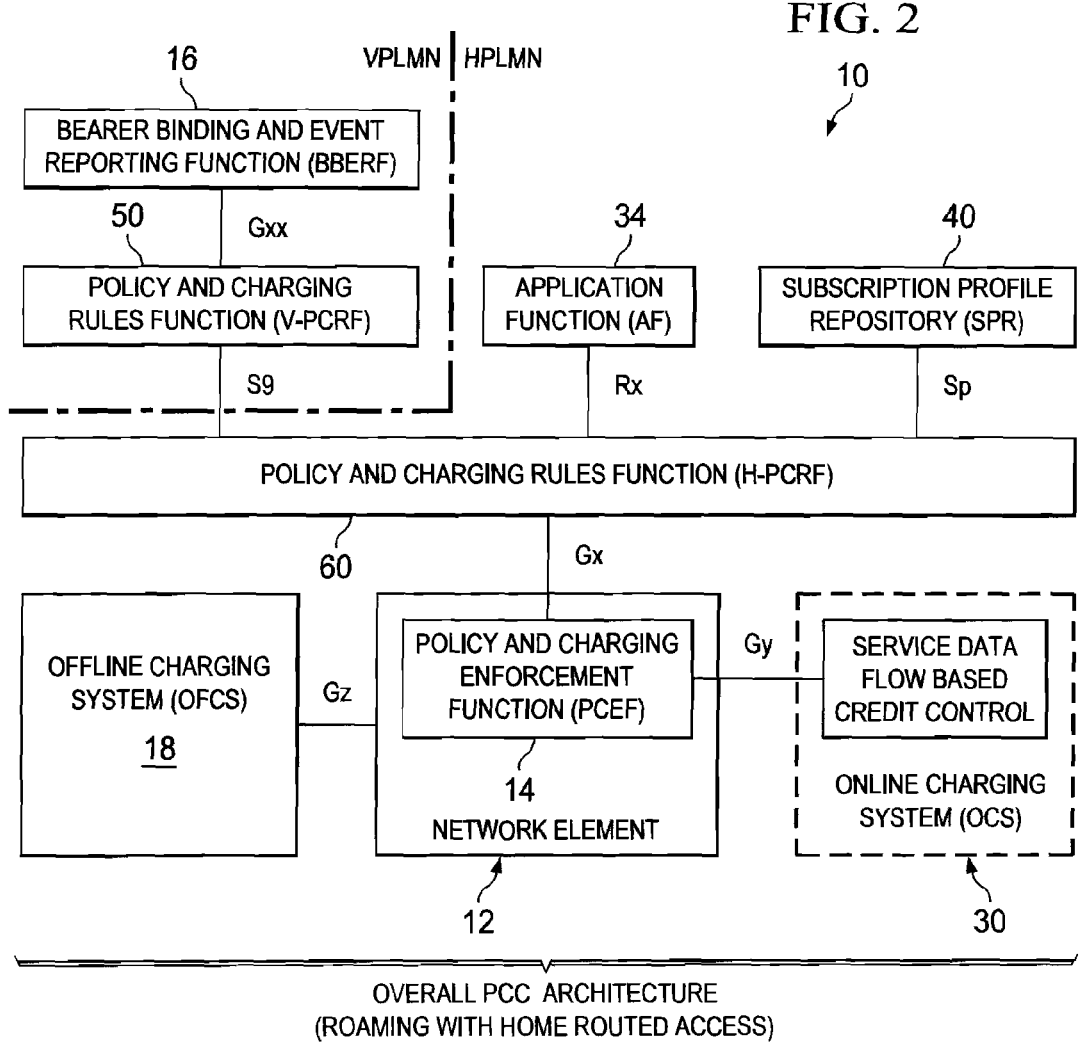
FIG. 2 is a simplified block diagram of an alternative example of the communication system where roaming occurs in accordance with one embodiment of the present invention.
Figure 3:
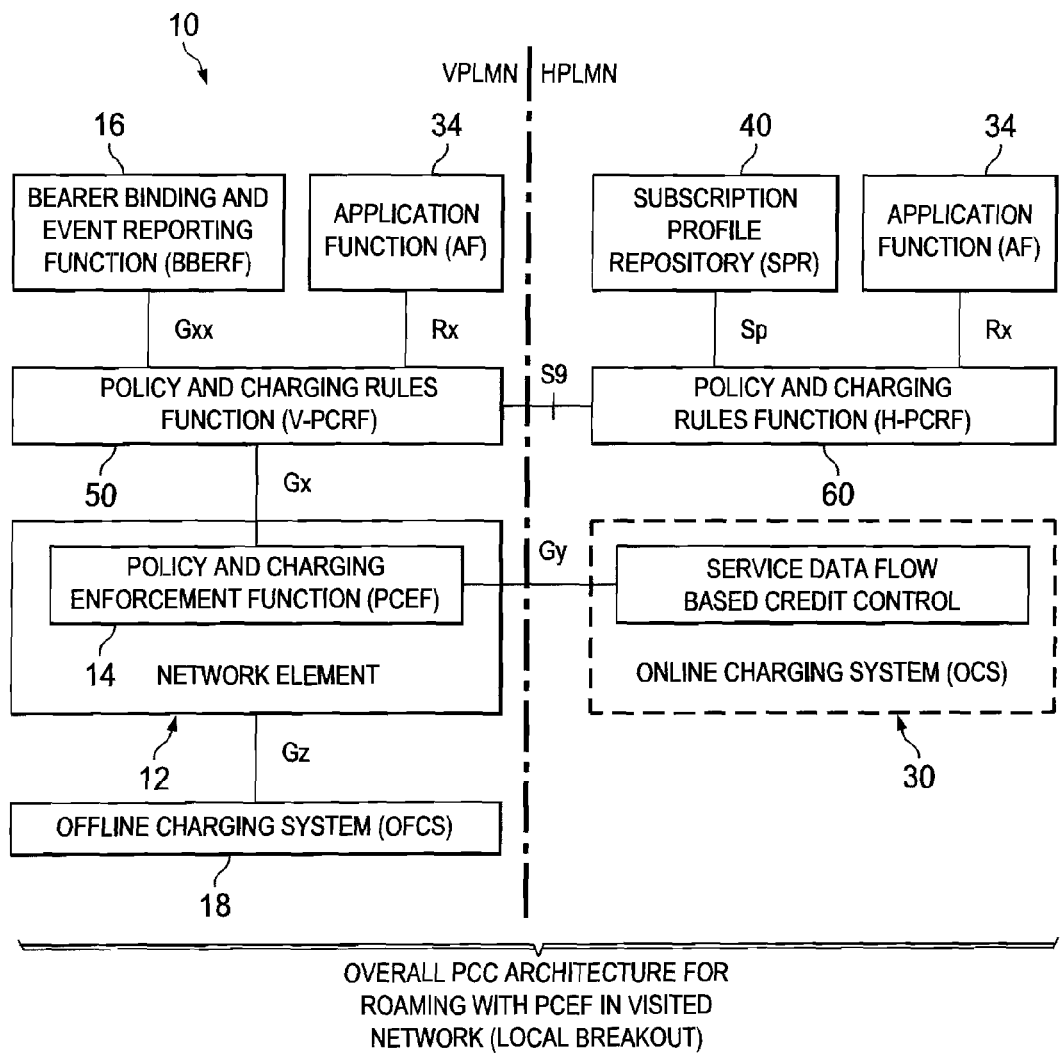
FIG. 3 is a simplified block diagram of another alternative example of the communication system where a visited network can be used in accordance with one embodiment of the present invention.

Turning to the example architecture of FIG. 2, FIG. 2 illustrates an overall PCC architecture, potentially with roaming with home routed access. It includes a Home PLMN (HPLMN) and a Visited PLMN (VPLMN) boundary for purposes of discussion. Similarly, FIG. 3 illustrates an overall PCC architecture for roaming with the PCEF in the visited network. A similar boundary is also delineated in this example architecture.

Turning to operations associated with the offered architecture, example embodiments of the invention assume the existence of a policy infrastructure, where the AF communicates with the PCRF that manages network, subscriber, and per-flow policies. The PCRF in turn communicates with the PCEF, which enforces those policies. The user's traffic traverses the PCEF. The PCEF also generates accounting data associated with the user session or specific flows, as instructed by the PCRF. For purposes of this discussion, such charging data can be sent to a charging data function (CDF). This type of architecture can be commonly used by all major NGN architectures, such as 3GPP Release 7/8, 3GPP2 SBBC, ETSI TISPAN, WiMAX NWG, and CableLabs PacketCable 2.0.

The concept can be broken into various components, which may include: 1) extensions to the AF/PCRF policy interface to request the PCRF to generate RTP quality metrics for a particular flow of packets; 2) extensions to the PCRF/PCEF policy interface to request the PCEF to generate RTP quality metrics for a particular flow of packets; 3) a functionality in the PCEF to generate specific RTP quality metrics for individual flows; 4) extensions to the PCEF/CDF accounting interface to provide the observed RTP quality metrics for a particular flow; and 5) extensions to the AF/PCRF/PCEF interfaces that allows the AF to request notification when certain quality thresholds are observed for a particular flow. These components may be part of network element 12, PCEF 14, PCRF 24, and/or BBERF 16.

For the policy interface extensions in #1) and #2) an "RTP Quality Metrics" information element is defined that conveys the types of RTP quality metrics to be performed for the call. Similarly, the PCEF/CDF accounting interface extensions in #3) are defined in an "Observed RTP Quality Metrics" information element that conveys the observed RTP quality metrics for the flow for which policy was being enforced.

In terms of the AF/PCRF/PCEF interface extensions, in the AF=>PCRF=>PCEF direction, a "RTP Quality Thresholds" information element is defined that outlines the triggering conditions (e.g., packet loss rate): both in terms of lower and upper bounds. In the reverse direction, a "Triggered RTP Quality Threshold" information element is defined that informs the PCRF and AF about the RTP Quality threshold that triggered (and with what value). This information can in turn be used by the AF to adjust parameters for the application. For example, a streaming media application may switch to a lower bandwidth codec, use additional forward error correction, etc.

The PCEF functionality and specific set of RTP quality metrics require a slightly different consideration. The basic set of RTP quality metrics provided by the PCEF are described, along with the method by which they are generated. The basic set of RTP quality metrics can be: a) RTP packet loss; b) RTP packet jitter; and c) RTP packet delay. RTP packet loss can be calculated by simple inspection of the RTP sequence number (e.g., as described in RFC 3550). Separate values could be provided for each direction. RTP packet jitter can be calculated based on the RTP timestamps (e.g., as described in RFC 3550). Separate values could be provided for each direction. RTP packet delay calculation requires a different consideration (and processing). Furthermore, it depends on the PCEF being able to peek inside RTCP reports and, hence, it requires that such reports are issued in the first place as well as them being in clear-text. Assuming, the RTP reports are available, the round-trip delay can be calculated in a manner similar to what is described in RFC 3550. For the local access network, the PCEF should record the time (t1) when a Sender Report from SSRC n is being transmitted through the PCEF to the destination r. The PCEF now looks for a Sender or Receiver report from r, and when it sees one, it again records the current time (t2), and extracts the "Delay Since Last SR" value for SSRC n from that RTCP packet. The round-trip delay on the local access network segment can now be calculated (e.g., as described in RFC 3550 (t2−t1−DSLR)). Round-trip delay for the remote access plus backbone segment can be done similarly, but with the process being initiated by SSRC r sending a Sender Report packet through the PCEF.

Note also that the RTP quality metrics could encompass an RTCP Extended Report (XR) in one example embodiment, or encompass any suitable permutation thereof or any element associated with RFC 3611.

The above defines the basic RTP quality metrics enabled by RFC 3550; however, additional metrics may be available. For example, RFC 3611 enables non-senders to calculate round-trip times by sending the Receiver Reference Time Report Block and receiving a delay since last RR (DLRR) Report Block in response. The PCEF could use these to calculate round-trip times as well.

Similarly, the PCEF may seek to report more accurate packet loss rates by excluding duplicates and reporting those separately. Packet loss bursts, gaps, etc. as defined in RFC 3611 may be reported as well. In summary, various quality metrics may be reported by the PCEF.

For each of the above, when the information is coupled with quality metric values from the endpoint or another entity in the network (e.g., a PCEF at the other end), the network segment where problems occur can be identified (e.g., local access, backbone, or remote access).

Both BBERF 16, PCEF 14, network element 12, and PCRF 24 are network elements that facilitate service flows between endpoints and a given network (e.g., for networks such as those illustrated in FIGS. 1-3). As used herein in this Specification, the term 'network element' is meant to encompass routers, switches, gateways, bridges, loadbalancers, firewalls, servers, or any other suitable device, component, element, or object operable to exchange information in a network environment. Moreover, these network elements may include any suitable hardware, software, components, modules, interfaces, or objects that facilitate the operations thereof. This may be inclusive of appropriate algorithms and communication protocols that allow for the effective exchange of data or information.

In one example implementation, network element 12, PCEF 14, and BBERF 16 include software to achieve the provisioning operations, as outlined herein in this document. In other embodiments, this feature may be provided external to the network elements or included in some other network device to achieve this intended functionality. Alternatively, both the network elements and the base stations include this software (or reciprocating software) that can coordinate in order to achieve the operations, as outlined herein. In still other embodiments, one or both of these devices may include any suitable algorithms, hardware, software, components, modules, interfaces, or objects that facilitate the operations thereof. This may be inclusive of appropriate communication protocols that allow for the effective exchange of data or information for achieving provisioning in a network environment.

Each of these components (BBERF 16, PCRF 24, PCEF 14, and network element 12) can also include memory elements for storing information to be used in achieving the provisioning operations as outlined herein. Additionally, each of these devices may include a processor that can execute software or an algorithm to perform the provisioning activities as discussed in this Specification. These devices may further keep information in any suitable random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs.

Note that with the examples provided herein, interaction may be described in terms of two, three, four or more network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated or sophisticated arrangements and configurations. Accordingly, the examples provided should not limit the scope or inhibit the broad teachings of communication system 10 as potentially applied to a myriad of other architectures.

It is also important to note that the steps described with reference to FIGS. 1-3 illustrate only some of the possible scenarios that may be executed by, or within, communication system 10. Some of these steps may be deleted or removed where appropriate, or these steps may be modified or changed considerably without departing from the scope of the present invention. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present invention.

Although the present invention has been described in detail with reference to particular arrangements and configurations, these example configurations and arrangements may be changed significantly without departing from the scope of the present invention.

Numerous other changes, substitutions, variations, alterations, and modifications may be ascertained to one skilled in the art and it can be intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. A method, comprising:
   requesting real-time transfer protocol (RTP) quality metrics to be generated for a specific flow in a network, wherein the RTP quality metrics are generated by a policy and charging rules function (PCRF); and recording the RTP quality metrics, wherein the metrics are reported as accounting data associated with the flow, wherein an RTP quality thresholds information element is configured to outline a trigger condition associated a selected one of the RTP quality metrics, and wherein the trigger condition includes an upper bound and a lower bound associated with a packet loss rate for the specific flow, and wherein exceeding one of the thresholds causes an application function to adjust parameters for an associated application in order to configure the packet loss rate for the specific flow to be between the thresholds.

2. The method of claim 1, wherein the accounting data includes a correlator with application level accounting and the accounting data is used for quality monitoring and troubleshooting on a per-subscriber basis, a per-flow basis or on a per-call basis.

3. The method of claim 1, wherein the application function, for a streaming media application, switches to a lower bandwidth codec or uses additional forward error correction.

4. The method of claim 1, wherein the RTP quality metrics are RTP packet loss, RTP packet jitter, and RTP packet delay.

5. An apparatus, comprising:
a network element operable to request real-time transfer protocol (RTP) quality metrics to be generated for a specific flow in a network, wherein the RTP quality metrics are generated by a policy and charging rules function (PCRF), and wherein the RTP quality metrics are recorded by a policy and charging enforcement function (PCEF) and reported as accounting data associated with the flow, wherein an RTP quality thresholds information element is configured to outline a trigger condition associated a selected one of the RTP quality metrics, and wherein the trigger condition includes an upper bound and a lower bound associated with a packet loss rate for the specific flow, and wherein exceeding one of the thresholds causes an application function to adjust parameters for an associated application in order to configure the packet loss rate for the specific flow to be between the thresholds.

6. The apparatus of claim 5, wherein the accounting data includes a correlator with application level accounting and the accounting data is used for quality monitoring and troubleshooting on a per-subscriber basis.

7. The apparatus of claim 5, wherein the accounting data includes a correlator with application level accounting and the accounting data is used for quality monitoring and troubleshooting on a per-call basis or a per flow basis.

8. The apparatus of claim 5, wherein the application function, for a streaming media application, switches to a lower bandwidth codec or uses additional forward error correction.

9. The apparatus of claim 8, wherein the RTP quality metrics are RTP packet loss, RTP packet jitter, and RTP packet delay.

10. The apparatus of claim 5, wherein a selected one of the RTP quality metrics encompasses an RTCP Extended Report (XR).

11. A non-transitory computer medium including logic for execution and when executed by a processor operable to:
request real-time transfer protocol (RTP) quality metrics to be generated for a specific flow in a network, wherein the RTP quality metrics are generated by a policy and charging rules function (PCRF); and
record the RTP quality metrics, wherein the metrics are reported as accounting data associated with the flow, wherein an RTP quality thresholds information element is configured to outline a trigger condition associated a selected one of the RTP quality metrics, and wherein the trigger condition includes an upper bound and a lower bound associated with a packet loss rate for the specific flow, and wherein exceeding one of the thresholds causes an application function to adjust parameters for an associated application in order to configure the packet loss rate for the specific flow to be between the thresholds.

12. The logic of claim 11, wherein the accounting data includes a correlator with application level accounting and the accounting data is used for quality monitoring and troubleshooting on a per-subscriber basis, a per-flow basis, or on a per-call basis.

13. A system, comprising:
means for requesting real-time transfer protocol (RTP) quality metrics to be generated for a specific flow in a network, wherein the RTP quality metrics are generated by a policy and charging rules function (PCRF); and
means for recording the RTP quality metrics, wherein the metrics are reported as accounting data associated with the flow, wherein an RTP quality thresholds information element is configured to outline a trigger condition associated a selected one of the RTP quality metrics, and wherein the trigger condition includes an upper bound and a lower bound associated with a packet loss rate for the specific flow, and wherein exceeding one of the thresholds causes an application function to adjust parameters for an associated application in order to configure the packet loss rate for the specific flow to be between the thresholds.

14. The system of claim 13, wherein the accounting data includes a correlator with application level accounting and the accounting data is used for quality monitoring and troubleshooting on a per-subscriber basis, a per-flow basis, or on a per-call basis.

* * * * *